US012318810B2

(12) United States Patent
França

(10) Patent No.: US 12,318,810 B2
(45) Date of Patent: Jun. 3, 2025

(54) METHOD FOR TREATING THE SURFACE OF METAL FOILS WITH UV-CURED PROTECTIVE VARNISH

(71) Applicant: BRASILATA S/A EMBALAGENS METÁLICAS, Jundiaí-SP (BR)

(72) Inventor: Augusto Ferreira França, São Paulo (BR)

(73) Assignee: BRASILATA S/A EMBALAGENS METÁLICAS, Jundiaí (BR)

(*) Notice: Subject to any disclaimer, the term of this patent is extended or adjusted under 35 U.S.C. 154(b) by 0 days.

(21) Appl. No.: 17/918,470

(22) PCT Filed: Apr. 12, 2021

(86) PCT No.: PCT/BR2021/050147
§ 371 (c)(1),
(2) Date: Oct. 12, 2022

(87) PCT Pub. No.: WO2021/207811
PCT Pub. Date: Oct. 21, 2021

(65) Prior Publication Data

US 2023/0147245 A1 May 11, 2023

(30) Foreign Application Priority Data

Apr. 13, 2020 (BR) ......................... 102020007308 7
Apr. 8, 2021 (BR) ......................... 102021006761 6

(51) Int. Cl.
*B05D 7/16* (2006.01)
*B05D 3/06* (2006.01)
*B05D 3/14* (2006.01)

(52) U.S. Cl.
CPC ............... *B05D 7/16* (2013.01); *B05D 3/067* (2013.01); *B05D 3/142* (2013.01); *B05D 2202/00* (2013.01); *B05D 2501/00* (2013.01)

(58) Field of Classification Search
None
See application file for complete search history.

(56) References Cited

U.S. PATENT DOCUMENTS 5,128,387 A * 7/1992 Shustack .................. C09D 4/06
522/91
6,548,121 B1 * 4/2003 Bauer .................. C23C 14/024
427/538

(Continued)

FOREIGN PATENT DOCUMENTS

BR PI0517257-8 A 10/2008
CA 2348378 A1 5/2000

(Continued)

OTHER PUBLICATIONS

"Power Triangle and Power Factor" (2023) found at https://www.electronics-tutorials.ws/accircuits/power-triangle.html (Year: 2023).*

(Continued)

*Primary Examiner* — Jose I Hernandez-Kenney
(74) *Attorney, Agent, or Firm* — Dinsmore & Shohl LLP

(57) ABSTRACT

The method includes the steps of: applying atmospheric plasma on each area portion of the surface of a metal foil to be treated; increasing the surface free energy of the metal foil, making said surface free energy compatible with the surface tension of the varnish to be applied to the metal foil; applying a UV-cured varnish layer, which may be a oligomer, a monomer or a photo-initiator, having a solids content of 99% to 100% to the surface of the metal foil subjected to the atmospheric plasma; and curing the varnish layer using UV radiation to form a varnish coating adhered to the surface of the metal foil.

8 Claims, 1 Drawing Sheet

(56) References Cited

U.S. PATENT DOCUMENTS

| | | | | |
|---|---|---|---|---|
| 2002/0025387 | A1* | 2/2002 | Kuckertz | B05D 3/142 427/569 |
| 2006/0257681 | A1* | 11/2006 | Wolf | C08F 290/06 525/440.03 |
| 2009/0068375 | A1* | 3/2009 | Dobbyn | C23C 4/134 427/569 |
| 2016/0064195 | A1* | 3/2016 | Lin | A43D 11/00 156/64 |

FOREIGN PATENT DOCUMENTS

| | | | | | |
|---|---|---|---|---|---|
| EP | 526396 | B1 | * | 3/1996 | B41M 3/06 |
| JP | 2000273399 | A | | 10/2000 | |
| JP | 2002212509 | A | | 7/2002 | |
| WO | 0024527 | A1 | | 5/2000 | |
| WO | WO-2013017783 | A1 | * | 2/2013 | B05D 3/142 |

OTHER PUBLICATIONS

Tin Plate & Tin Coated Sheet. Randall Metals Corporation (2019). Retrieved from https://www.randallmetals.com/products/tin-plate-tin-coated-sheet/ [web archive version found at web.archive.org (Year: 2019).*

Lopes, B. B., Plasma—O agente promotor de adesão em polimeros e sua facilidade de inserção em processos produtivos, plastico.com.br, https://www.plastico.com.br/artigo-tecnico-plasma-o-agente-promotor-de-adesao-em-polimeros-e-sua-facilidade-de-insercao-em-processos-produtivos/, Jun. 8, 2015; appears to correspond to Lopes, B. B., Plasma: agente promotor de adesão em polímeros e sua facilidade de inserção em processos produtivos. Plástico Moderno, p. 31-35, Mar. 4, 2015.

PCT Written Opinion of the International Searching Authority for Application No. PCT/BR2021/050147 dated Apr. 12, 2021 (16 pages).

* cited by examiner

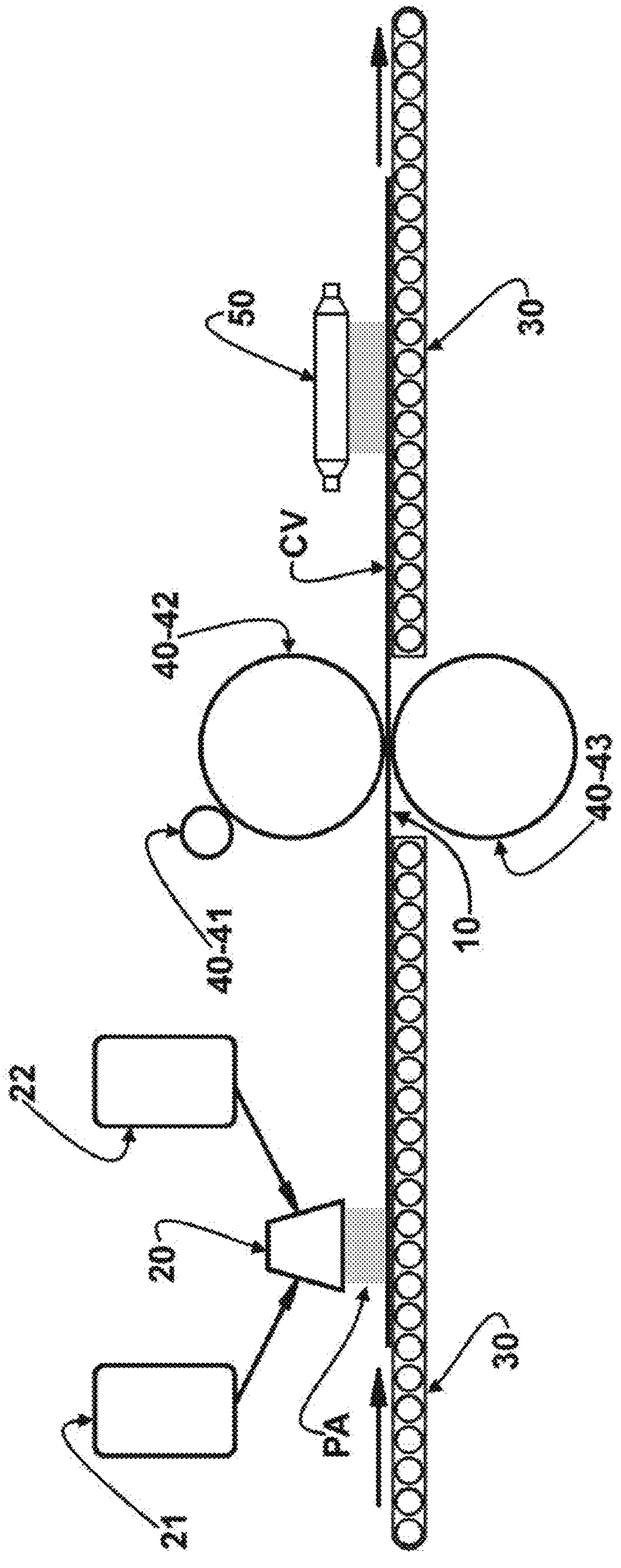
50
30
CV
40-42
40-43
10
40-41
22
20
30
PA
21

METHOD FOR TREATING THE SURFACE OF METAL FOILS WITH UV-CURED PROTECTIVE VARNISH

CROSS-REFERENCE TO RELATED APPLICATIONS

The present application is the National Phase entry of International Patent Application No. PCT/BR2021/050147 filed Apr. 12, 2021, which claims priority to Brazilean Patent Application No. 10 2020 0073087 filed Apr. 13, 2020 and Brazilean Patent Application No. 10 2021 0067616 filed Apr. 8, 2021, the entire contents of which are both hereby incorporated by reference into this application.

TECHNICAL FIELD

The present disclosure refers to a method for providing the treatment of the surface of metal foils, coated or not with chromium and tin, particularly of metal foils used in the metal packaging industry, by application of atmospheric plasma, allowing that a protective varnish, curable by ultraviolet radiation, is applied, with good adhesion and high wettability, on one or both faces of the metal foil used in the formation of the bodies and components of these packages, which generally take the form of cans of two, three or more pieces.

BACKGROUND

The metal packaging industry uses, as a basic substrate for its products, steel foils formed with a high content of iron and low carbon and which need protection against moisture, to avoid oxidation, which leads to the loss of the packaging and the product packed therein.

The steel industry, which supplies steel foil coils for the formation of metallic packages, generally applies an electrolytic deposition process to said metal foil, to form therein an intermetallic surface layer of tin or chromium, the metal foil being subject to a heat treatment to consolidate the crystallography/granulometry and the porosity of the chromium or free tin layer.

The above treatment is provided to increase the corrosion resistance. However, since the treatment above mentioned is made by another metal (chromium or tin) and is generally applied at a range from 1.0 to 11.2 g/m$^2$, it creates a layer extremely thin, from 1 to 2 nm, which is not effective for the finished product that will suffer mechanical stress, not only in the assembly of the cans and their components (lid and bottom), but also in their transport, packaging, handling and exposure to the weathering at the environment where the package will be stored or offered for sale. For this reason, it is necessary to apply a varnish on one or both faces of the metal foil, to protect the steel forming the package, preventing its oxidation.

For obtaining a homogeneous spreading and a degree of adhesion in relation to the surface of the metal foil, the varnishes currently used for the protection of metallic packages have, in their chemical composition, about 50% of solvents. This specific characteristic causes that at least half of the varnish content to be lost in the thermal curing process, with the solvent turning into highly toxic vapor, which has to be necessarily incinerated before reaching the atmosphere.

The solvent is the standard medium that allows obtaining the required and correct spreading degree of the varnish on the metal foil, entering the grooves of the metallic substrate and carrying the solids of the varnish to the entire surface of the metal foil, to which the varnish solids easily adhere.

The current process has flexibility, good spreading, and stretching, and adhesion properties, in addition to minimizing the effects of grease or residual dirt on the metallic surface, dissolving or dispersing these contaminants. However, these varnishes of the current process use solvents that have a high percentage of volatile organic compounds, which are evaporated when curing or drying the varnish by applying heat and forced convection in large equipment, consuming high energy and processing time.

The volatile compounds of the solvent-based varnishes can be defined by a single compound or, for example, by a mixture of ethers, acetates, aromatics, glycol ethers and aliphatic hydrocarbons, requiring the use of costly incineration systems, so that they are not released into the atmosphere, which could cause great harm to the environment.

Varnishes free of volatile compounds, that is, varnishes that after the curing process, have about 99% to 100% of their components solidified on the metal foil, forming a single polymer, for example, as proposed in the method object of the present disclosure, cannot be used without changing the surface free energy of the metal foil to a value compatible with the surface tension of the varnish to be applied in liquid state.

The compatibility of the surface tension values of the varnish in liquid state, with the free energy of the metal foil solid surface, is necessary to avoid the formation of spherical droplets, leading to a high concentration of a varnish layer in certain points of the metal foil surface and a reduced layer or even no layer applied to other points. The free energy of a solid is closely related to its wettability, that is, its ability to form a common interface with the liquid that enters in contact with it. The compatibility of the values of free energy and surface tension allows a homogeneous spreading and a desired and safe adhesion of the varnish to the surface of the metal foil.

SUMMARY

Due to the inconveniences related to the use of solvent-based varnishes and to the difficulty of obtaining adequate spreading and adhesion of varnishes with high concentrations of solids, the present disclosure aims to provide a method that allows the application of varnishes of protection, cured by ultraviolet radiation, in metal foils, uncoated or coated with chromium or tin and used in the metal packaging industry for internal and external protection of can bodies and components.

The method in question allows the replacement of solvent-based varnishes of thermal curing, which require large furnaces which uses gas to generate heat and a high volume of organic vapor highly harmful to man and to the environment, by varnishes cured by ultraviolet light and compatible with the environment.

The method in question generates substantial process savings, as it allows the deactivation of gas furnaces and organic vapor incinerators, which have a high maintenance cost compared to that of the new ultraviolet curing lines, used in the technical solution proposed herein.

The method includes treating the surface of the metallic substrate, cleaning and activating it by atmospheric plasma. This procedure raises the free energy of the metallic substrate to a value equal to or greater than the surface tension value of the UV-curing varnish to be applied to said substrate, allowing an increase of about 8 times the polar part of said free energy, which has a hydrophilic characteristic and, thus, improving the adhesion properties and wettability of the metal foil and allowing a correct spreading of the varnish and a high adhesion degree to the metallic substrate.

Every substance seeks the lowest possible free energy. Liquids, in the absence of weight influence, form a spherical drop. Solids, in turn, cannot deform their surface to concentrate in the smallest possible space, but they can form a common and compatible interface with a liquid, to reduce the free energy, that is, they can be wetted. Therefore, the surface free energy of a solid is closely related to its wettability and, consequently, to the spreading degree of varnishes. The terms "surface free energy" and "surface tension" are physically equivalent. The term surface free energy is generally used for solid surfaces and surface tension for liquid surfaces. Occasionally, however, the term surface tension of a solid is also used. The expression "free" indicates the part of the energy that can be converted into mechanical work, as opposed to internal energy, which also contains heat-related entropy. The term "free" is often omitted.

BRIEF DESCRIPTION OF THE DRAWINGS

The present disclosure will be described below, with reference to the attached drawing in which:

FIG. 1 represents, in a schematic and simplified way, the steps of the method of treatment of the present disclosure when applied for surface protection of metal foils.

DESCRIPTION OF THE METHOD

As already mentioned and illustrated in FIG. 1 of the attached drawing, the method of the present disclosure aims to provide a surface protective treatment on one or both faces of metal foils 10, by the application of a protective varnish, curable by ultraviolet radiation.

The metal foil 10, submitted to the present method, may be coated or not with chromium or tin and is particularly used in the metallic packaging industry in the form of cans formed with two or three pieces.

According to the method, the metal foil 10 has any of its faces submitted to contact with an ionized gas called atmospheric plasma PA, which is considered the fourth state of matter and which is released against the surface to be treated, from a plasma nozzle 20.

Atmospheric plasma PA is produced by a controlled discharge of electrical energy made by a plasma generator 21, of high frequency and high voltage, inside the plasma nozzle 20, which is further fed, by compressed air, from a compressed air generator 22. FIG. 1 of the attached drawing illustrates only one plasma generator 21, of high frequency and high voltage, a compressed air generator 22 and a plasma nozzle 20 generating atmospheric plasma PA that impinges on the surface of a metal foil 10. It should be understood that the number of plasma nozzles 20 and plasma generators 21 could vary according to the transversal dimension of the metal foil 10, the relative displacement speed between the metal foil 10 and the plasma nozzles 20 and the intensity of the plasma nozzles.

FIG. 1 of the drawing illustrates an example of the displacement of a metal foil 10 by conveyor belts 30 passing under the atmospheric plasma PA at a linear speed determined by the other parameters mentioned above and related to the type of metal foil 10 and to the power of the plasma nozzles 20, assuming that the latter are adequate in number and positioning for the necessary coverage of the width of the metal foil 10 passing under the atmospheric plasma PA.

The surface free energy of the metal foil 10 before its exposition to the atmospheric plasma is on average from 28 to 45 mN/m, the polar part, considered hydrophilic, being low, with averages from 1 to 3, for metal foils coated with tin, and from 4 to 5 for chromium plated foils, depending on their production, machining, layer of free tin or chromium and passivation. The cohesion between atoms and molecules, which causes the surface energy/tension of a substance, may be explained by different interaction types. In particular, dispersive interactions and polar interactions can be differentiated to each other. The interactions caused by temporary fluctuations of the load distribution in the atoms/molecules are called dispersive interactions (van der Waals interaction).

The polar interactions comprise Coulomb interactions between permanent dipoles and between permanent and induced dipoles (for example, hydrogen links). Since the van der Waals interactions occur between all the atoms and molecules, there is no substance with surface energy/tension that consists only of a polar part. The surface energy/tension $\sigma_i$ of a component i is composed, in an additive way, by dispersed parts $\sigma i^d$ and polar parts $\sigma i^p$ according to:

$$\sigma_i=\sigma_i^d+\sigma_i^p$$

The comparison of the proportion between the dispersive part and the polar part of the surface energy/tension, between the substrate and the varnish, allows predicting the adhesion between said two components. The closer the relationships between substrate and varnish are, the more interactions are possible between the components and a greater the adhesion between them.

After exposing the metallic substrate (steel foil) to the atmospheric plasma PA, with the plasma nozzle 20 positioned from 1 to 3 mm distant from the steel foil, using plasma generators 21, of high frequency and high voltage, with a flow of 50 to 60 liters of nitrogen per minute and at a pressure of 245 mbar (24.5 KPa) at the outlet of the jet, the substrate, in the form of a metal foil 10, under displacement at a speed of 40 to 80 m/min, has its surface free energy increased to parameters that can be adjusted to the compatible of the surface tension of the varnish to be applied, said surface free energy of the treated foil could be defined from 29 to 72 mN/m, with a high polar part, for metal foils coated with tin or chrome. If a metal foil coated with tin is used, with a surface free energy before the treatment of 41 mN/m, dispersive 39/polar 2, the result, after the plasma application, led to an increase of the free energy to 56 mN/m, with the polar part being 16. If a metal foil coated with chrome is used, with a surface free energy of 41 mN/m, dispersive 35/polar 6, the result, after the plasma application, led to an increase of the free energy to 56 mN/m, with the polar part being 16.

The plasma generator 21, of high frequency and high power, must be configured to generate 300 to 400 Volts, with the pulse frequency between 20 and 30 kHz, for reaching a power between 900 and 1000 W. The gas to be compressed can be oxygen or nitrogen, the latter, N2, being the most effective. The amount of gas released should be, in both cases, from 50 to 60 liters per minute, with a pressure from 240 to 250 mbar (24.5 to 25.0 KPa) at the outlet of the jet.

In the parameters above mentioned, it was found the stability between the metal foil surface and the varnish, allowing good wettability and adhesion of the used UV-cured varnishes. The foils can be then submitted, with success, to the standard tests "Scratch and tape—Adhesion" and reverse impact.

This procedure of pre-treatment produces the cleaning of the organic matter, the polarization of the metallic surface under treatment and the increase of the surface free energy of the steel of the metal foil 10, making said surface free energy compatible with the surface tension of the UV-cured varnish to be applied to the metal foil 10, allowing adhesion and spreading of the varnish on the foil, in a speed greater than 3500 steel foils per hour (foils coated with tin or with chromium), considering atmospheric plasma PA produced from nitrogen or from the compressed oxygen, using 56 liters of the gas per minute, at a pressure at the outlet of the jet of 245 mbar (24.5 KPa) and at a speed of the metal foils of about 50 m/min.

The metal foil 10, superficially treated by atmospheric plasma PA, is transported by the belts 30 to a varnish applicator 40, which can be, for example, defined by a varnish roller 41 feeding an applicator roller 42 which works in opposition to a support roller 43. Upon passing between the applicator roller 42 and the support roller 43, the metal foil 10 receives, on its face that contacts the applicator roller 42, a UV-cured varnish layer CV. Immediately after, the metal foil 10 enters into a cure unit 50, which is formed, for example, by mercury vapor or LED lamps, which generate sufficient ultraviolet radiation to activate the photo-initiators of the chemical composition of the varnish, producing its polymerization, its adhesion to the surface of the metal foil and a total covering and protection of the mentioned surface of the metal foil to be used in the production of bodies, domes and bottoms of metallic packages.

It is necessary to use varnishes with high solid content, without dispersants or vehicles based on chemical solvents, and cured by ultraviolet radiation generated by mercury vapor lamps.

The varnishes used in this process comprise oligomers, monomers and photo-initiators, applied by lithographic roller 42, without the need for dilution, with a viscosity from 40 to 60 Sec CF4/25° C., specific weight from 1.01 to 1.05/25° C. with solid contents from 99 to 100%.

The method in question allows the use of the protection product, that is the varnish, both on the internal and external parts of the bodies and components, dome and bottom, of metallic packages composed of three or two pieces, the varnish having 99% of solids cured by ultraviolet radiation, the method also allowing the substitution of the gas furnace by a curing station with UV lamps.

The curing of the varnish takes place by polymerization of the varnish caused by the interaction of the photo-initiator of the varnish composition with the ultraviolet radiation, above 100 mJ/cm2, emitted by the lamps of the curing unit 50, leads to a final dry layer of 4.65 to 7.75 g/m$^2$.

The effects of the method being now proposed may be listed as follows:

- Elimination of emission of gases harmful to health and environment;
- Elimination of the use of gas in the industrial process;
- Elimination of hazards in the environment, due to the use of non-flammable varnishes, in opposition to the methods that use solvent-based varnishes, which are eliminated by thermal curing and treatment of toxic gases;
- Reduction of plant spaces, with elimination of the gas furnace for thermal curing of the solvent-based varnishes and use of a UV curing station much smaller;
- Reduction of the maintenance of the application and treatment lines, since they are smaller and simplified;
- Significant savings in terms of maintenance, rent and less operators;
- Savings in freight, since it is no more necessary the transport of the varnish solvents previously used, but only the solids to be applied to the steel foil;
- Greater stability of the metallic substrate, ensuring better adherence and wettability.

The invention claimed is:

1. A method for treating the surface of metal foils with UV-cured protective varnish, the method comprising the steps of:

applying atmospheric plasma on at least a portion of a surface to be treated, of a metal foil, increasing a surface free energy of the metal foil, making the surface free energy compatible with a surface tension of the varnish to be applied to the metal foil, wherein the surface free energy of the metal foil after applying the atmospheric plasma is from 29 mN/m to 72 mN/m, the metal foil is coated with tin or chrome;

applying, on the surface of the metal foil, submitted to the atmospheric plasma, a UV-cured varnish layer, selected from compounds of oligomers, monomers and photo-initiators, with a viscosity from 40 to 60 Sec CF4/25° C., specific gravity from 1.01 to 1.05/25° C. and with a solids content from 99% to 100%; and curing the varnish layer, applied on the surface of the metal foil, by polarization of the varnish compounds, by interaction of the photo-initiator with UV radiation in a curing unit, forming a varnish coating adhered to the surface of the metal foil, wherein the atmospheric plasma is released, on the surface to be treated of the metal foil, from at least one plasma nozzle, the atmospheric plasma being produced by a controlled discharge of electrical energy made by a plasma generator, inside the plasma nozzle, the atmospheric plasma being fed by compressed air or nitrogen or oxygen from a compressed gas generator, and wherein the plasma generator generates 300 to 400 Volts, with a pulse frequency from 20 to 30 kHz and a power from 900 to 1000 W, with the gas to be compressed being selected from oxygen or nitrogen and in an amount from 50 to 60 liters per minute, with a pressure from 240 to 250 mbar.

2. The method, according to claim 1, wherein the curing unit applies, to the varnish layer, an ultraviolet radiation above 100 mJ/cm2, emitted by mercury vapor or LED lamps.

3. The method, according to claim 1, wherein the varnish coating has a thickness from 4.65 to 7.75 g/m$^2$.

4. The method, according to claim 3, wherein the metal foil is maintained at a distance from 1 to 3 mm of the plasma nozzle, moving at 50 m/min, submitted to the atmospheric plasma at a flow of 56 liters of nitrogen per minute and at a pressure of 245 mbar, to present a surface free energy of 56 mN/m.

5. The method, according to claim 3, wherein the curing unit applies, to the varnish layer, an ultraviolet radiation above 100 mJ/cm2, emitted by mercury vapor or LED lamps.

6. The method, according to claim 1, wherein the metal foil is maintained at a distance from 1 to 3 mm of the plasma nozzle, moving at 50 m/min, submitted to the atmospheric plasma at a flow of 56 liters of nitrogen per minute and at a pressure of 245 mbar, to present a surface free energy of 56 mN/m.

7. The method, according to claim 6, wherein the curing unit applies, to the varnish layer, an ultraviolet radiation above 100 mJ/cm2, emitted by mercury vapor or LED lamps.

8. The method, according to claim 1, wherein the curing unit applies, to the varnish layer, an ultraviolet radiation above 100 mJ/cm2, emitted by mercury vapor or LED lamps.

* * * * *